(12) United States Patent
Wong et al.

(10) Patent No.: US 6,963,887 B2
(45) Date of Patent: Nov. 8, 2005

(54) METHOD AND DEVICE FOR PERFORMING DATA PATTERN MATCHING

(75) Inventors: Wee Mon Wong, Irvine, CA (US); Maurice David Caldwell, Robbinsville, NJ (US)

(73) Assignee: Sarnoff Corporation, Princeton, NJ (US)

( * ) Notice: Subject to any disclaimer, the term of this patent is extended or adjusted under 35 U.S.C. 154(b) by 677 days.

(21) Appl. No.: 09/956,775

(22) Filed: Sep. 19, 2001

(65) Prior Publication Data

US 2002/0059445 A1 May 16, 2002

Related U.S. Application Data

(60) Provisional application No. 60/234,830, filed on Sep. 22, 2000.

(51) Int. Cl.[7] .................................................. G08F 7/38
(52) U.S. Cl. ....................................................... 708/210
(58) Field of Search ......................................... 708/210

(56) References Cited

U.S. PATENT DOCUMENTS

| | | | |
|---|---|---|---|
| 3,927,259 A | * 12/1975 | Brown | ........................ 340/657 |
| 3,927,260 A | * 12/1975 | Amundson et al. | ......... 340/657 |
| 4,066,964 A | 1/1978 | Costanza et al. | |
| 4,493,093 A | 1/1985 | Veillard | |
| 4,816,989 A | 3/1989 | Finn et al. | |
| 4,847,877 A | 7/1989 | Besseyre | |
| 5,014,327 A | * 5/1991 | Potter et al. | ................. 382/220 |
| 5,016,005 A | 5/1991 | Shaw et al. | |
| 5,297,185 A | * 3/1994 | Best et al. | .................... 375/368 |
| 5,570,306 A | * 10/1996 | Soo | ............................. 708/212 |
| 5,666,547 A | * 9/1997 | James et al. | ................... 710/58 |
| 5,870,444 A | 2/1999 | Mynett et al. | |
| 5,987,038 A | * 11/1999 | Staszewski et al. | .......... 370/514 |
| 6,513,053 B1 | * 1/2003 | Hill | ............................. 708/210 |

* cited by examiner

*Primary Examiner*—Tan V. Mai
(74) *Attorney, Agent, or Firm*—William J. Burke

(57) ABSTRACT

A method and system for identifying a bit pattern in a data stream including a plurality of bits each having a first or second state, the method includes identifying a number of mismatching bits, within a subset of the plurality of bits, having the first state and corresponding to a bit having the second state within the pattern; identifying a number of bits in the subset having the first state; and, identifying a number of bits in the pattern having the second state. A number of matches of between the subset and the pattern is dependent on the identified number of mismatching bits, the identified number of bits in the subset having the first state and the identified number of bits in the pattern having the second state.

54 Claims, 4 Drawing Sheets

METHOD AND DEVICE FOR PERFORMING DATA PATTERN MATCHING

RELATED APPLICATION

This application claims priority of U.S. patent application Ser. No. 60/234,830, filed Sep. 22, 2000, entitled WIDE SERIAL DATA PATTERN MATCHING AND SYNCHRONIZATION.

FIELD OF THE INVENTION

The present invention relates generally to data pattern matching, and more particularly to methods and devices for performing serial data pattern matching and synchronization.

BACKGROUND OF INVENTION

The desirability of synchronizing a receiver with an incoming data stream is well documented. When the incoming data stream is divided into frames, or packets of transmitted information in the case of a packet switching network, frame synchronization as is conventionally understood can be used. Detection and identification of a given pattern can be used to provide frame synchronization. In some digital systems, this given pattern is referred to as a "sync pattern" or "sync word". For example, a sync word may be inserted as the first field of a frame of a serial digital data signal. The purpose of the sync word is to enable a receiver or receiving circuitry to determine where in a serial bit stream payload information, or data information, is present. This payload information can begin at some predefined location within a frame relative to where the given sync pattern or sync word is inserted. For example, the first bit of the payload data may begin on a first bit after the last bit in the given sync pattern. Once a receiver achieves sufficient frame synchronization, or "sync pattern lock", the sync pattern or field may be expected to be periodically repeated and identified in order to identify data partitions in the incoming serial data stream. An example of this is the repetition of a sync word to partition different frames of data.

Further, a specific sync pattern or sync word can be established for a given system or receiver within a system. This specified sync pattern, or sync word, can then be used as a reference against which to compare the incoming data stream. Alternately, a system may utilize a predictably changing or dynamic sync pattern. In either case, the incoming data stream is viewed or evaluated using a field corresponding to the sync pattern.

There is a need for a method and device for performing data pattern matching and for assisting in identifying bit sequences in an incoming data stream, such as those suitable for use in synchronizing a receiver with an incoming data stream.

SUMMARY OF THE INVENTION

A method and system for identifying a bit pattern in a data stream including a plurality of bits each having a first or second state, the method including: identifying a number of mismatching bits, within a subset of the plurality of bits, having the first state and corresponding to a bit having the second state within the pattern; identifying a number of bits in the subset having the first state; and, identifying a number of bits in the pattern having the second state; wherein, a number of matches of between the subset and the pattern is dependent on the identified number of mismatching bits, the identified number of bits in the subset having the first state and the identified number of bits in the pattern having the second state.

BRIEF DESCRIPTION OF THE FIGURES

The invention will be better understood with reference to the following illustrative and non-limiting drawings, wherein.

DETAILED DESCRIPTION OF THE INVENTION

Figure 1:
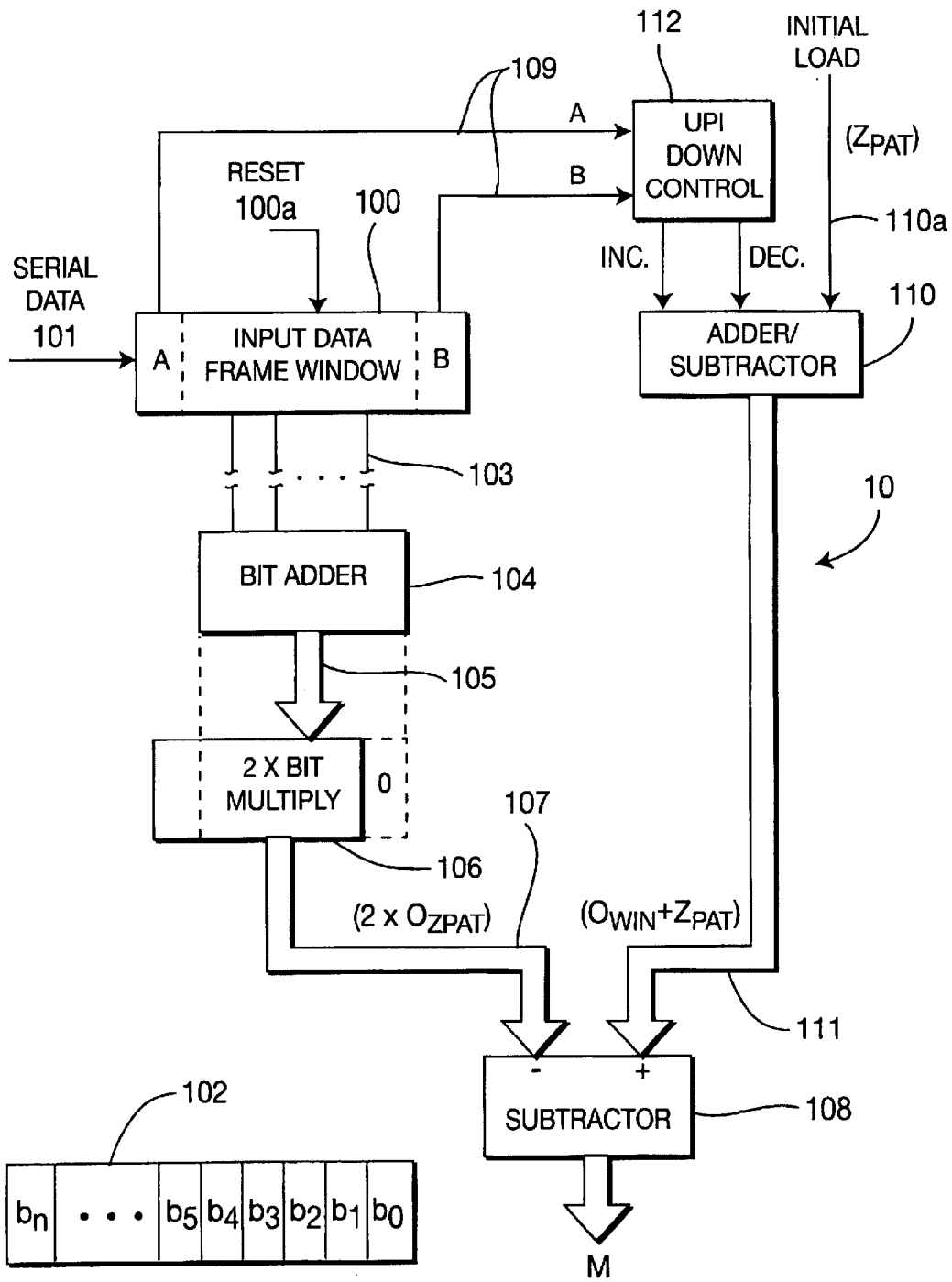
FIG. 1 illustrates a depiction of a bit pattern match device according to a first embodiment of the present invention.

The entire disclosure of U.S. patent application Ser. No. 60/234,830, filed Sep. 22, 2000, entitled WIDE SERIAL DATA PATTERN MATCHING AND SYNCHRONIZATION is hereby incorporated by reference as if being set forth in its entirety herein.

According to an aspect of the present invention, a count of the bit matches is determined using bit-by-bit comparison. This is useful for identifying a first bit of frame-aligned data to be received, for example. If the determined number of matching bits exceeds a given threshold, such as when the number of matching bits is equal to the number of total bits in the sync field or word for example, then a bit-for-bit correspondence between the sync word and the incoming serial data field is identified. Thus, a receiver can be synchronized with the incoming data stream.

Further, according to an aspect of the invention, a tolerance on the detection can be used such that the system can maintain or establish word or frame lock and tolerate errors. That is, if the total number of bits in a match is off by one or just a few bits, or if detected errors are below a certain threshold, the presence of a sync word can still be established. This allows the system to stay in lock despite the presence of a few sync bit errors, for example.

The present invention generally provides a method and device for counting the total number of matches by comparing a given pattern and a sampled incoming serial data field of at least equal length to determine to what extent an incoming data stream matches the given pattern.

The comparison of the incoming serial data and the given pattern may be accomplished by determining a total number of bit matches in two fields. This may be accomplished by determining the total number of bit matches ("M") of a frame window as compared to the given pattern, or sync pattern, where $$M = O_{match} + Z_{match},\qquad \text{Equation (1)}$$

and, $O_{match}$ is the total number of one matches and $Z_{match}$ is the total number of zero matches. Hence, the total number of matches between a sync word and an incoming serial bit field is equal to the total of the number of matches of ones and zeros between the two fields. Further, $$O_{match} = O_{win} - O_{Zpat},$$

where $O_{win}$ is the total number of ones in the frame window (incoming data), and $O_{Zpat}$ is the total number of ones at zero pattern locations in the frame window. Further, $$Z_{match} = Z_{pat} - O_{Zpat}$$

where $Z_{pat}$ is the total number of zeros in the sync pattern. Thus, $$M = (O_{win} - O_{Zpat}) + (Z_{pat} - O_{Zpat}) \quad \text{Equation (2)}$$

Consequently:

$$M = O_{win} + Z_{pat} - 2 * O_{Zpat} \quad \text{Equation (3)}$$

According to an aspect of the present invention, and as will be discussed, an approach which leverages the relationship expressed in Equation (3) is particularly well suited for operation where the total number of ones in the given pattern, or sync word, is equal to or exceeds the total number of zeros in the given pattern, or sync word.

A similar but slightly modified approach has also been determined to be desirable where the total number of zeros in the given pattern, or sync word, is greater than the total number of ones in the given pattern, or sync word. Again, the count of the number of total bit matches can be expressed as:

$$M = Z_{match} + O_{match}, \quad \text{Equation (4)}$$

where M, $Z_{Match}$, and $O_{Match}$ are defined as hereinabove. Thus, following a similar analysis:

$$M = (Z_{win} - Z_{Opat}) + (O_{pat} - Z_{Opat}), \quad \text{Equation (5)}$$

where $Z_{win}$ is the total number of zeros in the entire data frame window, $Z_{Opat}$ is the total number of zeros in the data frame window that correspond to bit locations at which there are ones in the sync pattern, and $O_{pat}$ is the total number of ones in the sync pattern. Thus, analogously to Equation 3 above:

$$M = Z_{win} + O_{pat} - 2 * Z_{Opat}, \quad \text{Equation (6)}$$

Hence, M may be expressed as a count of the total number of matching logical one and matching logical zero bits that are located in corresponding bit locations as between a sync pattern and at least one sampled data frame window. In other words, M is a count of the number of bit matches, or the total number of logical zeros in the frame window added to the total number of logical ones in the sync pattern, minus twice the number of logical zeros in the data frame window that correspond to logic one bit locations in the data frame window.

According to an aspect of the present invention, and as will be discussed, an approach which leverages the relationship expressed in Equation (6) is particularly well suited for operation where the total number of zeros in the given pattern, or sync pattern, exceeds the total number of ones in the given pattern or sync word.

Referring now to the Figures, like references therethroughout designate like elements of the invention. Referring more particularly now to FIG. 1, there is shown a functional block diagram representation of a pattern match bit counter device 10 that generates a count of the total number of bit matches between a given pattern and an input data frame window. The pattern match bit counter device 10 of FIG. 1 is particularly well suited for the condition where the total number of logical ones (ones) in a given pattern 102 is greater than or equal to the total number of logical zeros (zeros) in the same pattern 102. It should be understood that the statistics of the given pattern (i.e. number of ones or zeros in the sync pattern) is typically known or can be readily determined. The knowledge of these statistics can be obtained if the given pattern is in either a "hard" form, or a "soft" form. Examples of a hard form include a fixed, hardwired given pattern built into the system which does not readily change as the system operates, such as by hardwiring or by using connector-strapping sync word bit definitions, for example. Examples of a soft form include external reception or internal generation of a given pattern such as an on-the-fly sync pattern change received by a system or by an internal generation of a new given pattern via an internal controller.

Still referring to FIG. 1, an input data frame window 100 receives incoming data bits, which are to be compared with the sync pattern 102. According to an embodiment, the incoming bit data is received serially via an incoming serial digital data stream signal 101. The data frame window 100 is preferably at least the same number of bits wide as the given pattern or sync bit word 102, such that a bit-by-bit comparison can be made to determine when the given pattern 102 is present in the input data frame window 100.

The input data frame window 100 may be implemented as a series of concatenated flip flops forming a digital register at least "n" bits in length to correspond to the length "m" of the sync pattern 102 (where n≧m). In an embodiment, the incoming serial data stream 101 is loaded from left to right, bit by bit, such that a first incoming bit A is loaded first. The input data frame window 100 has an outgoing data bit B, that exits the input data frame window 100 whenever an incoming bit A is loaded into the data frame window. The input data frame window may take the form of any suitable register or set of flip-flops as is commonly known in the art. In that instance, as will be evident to one possessing an ordinary skill in the pertinent art, the bits A and B are merely the first and last bits present in the data frame window 100 at some instant.

Select bit position connections 103 are used to connect the input data frame window 100 with a bit adder 104. The selected bit connections 103 are selected based on the bit positions of zeros in the sync pattern 102. For example, if the pattern 102 has zeros in bit positions b1, b3, and b5, then the corresponding bit locations (b1, b3, and b5) in the input data frame window 100 are connected via communication path 103 from the input data frame window 100 to the bit adder 104. The bit adder 104 can take the form of a digital adder, as is known in the art, which is used to count the total number of ones in the data frame window that correspond to zero bit locations in the pattern 102. As will also be understood by those possessing an ordinary skill in the pertinent art, adder 104 thus produces the value of $O_{Zpat}$. The result of the digital addition of the ones at zero pattern locations is doubled by a digital (×2) multiplier 106. Thus multiplication can be performed on the digital contents of adder 104 by shifting the contents to the left one bit and appending a zero onto the rightmost bit location. This technique is well understood in the pertinent art. This left shift may be accomplished by a connection 107 between the most significant bit of the digital word output of the bit adder 104 to the next higher bit position on the digital input of a subtractor 108 subtrahend input, along with a corresponding one bit offset connection of all other bits in the word connection 107, along with the assertion of a zero in the least significant bit position. The multiplier can also be implemented by a digital register comprising flip-flops that performs a shift left of the input data or in any other conventional manner. In either case, the value of the output bits of the bit adder 104 is doubled and provided on the subtrahend input of the digital subtractor 108.

Still referring to FIG. 1, the bits of the input data frame window 100 at locations A and B are connected via interconnection 109 to an up/down control 112. The up/down control 112 operates to increment or decrement an adder/subtractor 110 according to the state table of Table 1.

TABLE 1

| Window Bit A | Window Bit B | Output Action |
|---|---|---|
| 0 | 0 | No Change |
| 0 | 1 | Decrement by 1 |
| 1 | 0 | Increment by 1 |
| 1 | 1 | No Change |

If an incoming bit (A) is a one and an exiting bit (B) is a zero, the count in the adder subtractor 110 is incremented by one count. If the incoming bit (A) is a zero and the exiting bit (B) is a one, the count in the adder/subtractor 110 is decremented by one count. If the total number of ones or zeros in the input data frame window remains the same (that is, bit A matches bit B), the adder/subtractor 110 count remains. The up/down control 112 may be implemented as a combinatorial decoder of the state table given herein or in any other conventional manner. The adder/subtractor 110 may be implemented as a standard adder/subtractor as is known in the art, or as a pre-settable up/down counter for example. The combination of up/down control 112 and adder/subtractor 110 may be implemented together as a single presetable up/down counter with appropriate up/down (increment/decrement) control inputs.

The adder/subtractor 110 is preset to the value of Zpat via initial load 110a. The output of the adder/subtractor 110 is connected via connection links 111 to the minuend input of the subtractor 108. The result of the subtractor 108 is the difference between the minuend (+) and subtrahend (−) inputs and is indicative of the value of M, which is the count of the total number of bit matches in the comparison between the given or sync pattern 102 and the data frame window 100. The subtractor 108 can take the form of a digital subtractor as is well known in the pertinent art.

The overall functionality of the blocks of FIG. 1 can be implemented in many ways as is understood by practitioners in the pertinent arts. The functionality of FIG. 1 can be achieved using any family of discrete logic, Medium Scale Integration (MSI), Large Scale Integration (LSI) logic, macros utilized in Field Programmable Gate Arrays (FPGAs), Application Specific Integrated Circuits (ASICs), or other types of firmware, for example. Further, implementation of the FIG. 1 functionality may be achieved with the use of synchronous logic design techniques such that functional blocks of FIG. 1 that require a clock are actuated by clock edges that are derived from a common or synchronous timing source, that is in a pipeline fashion. Implementation of the functionality of FIG. 1 can also be achieved via software (e.g., by using a plurality of instructions or code), or any suitable combination of hardware, firmware and/or software.

According to an embodiment of the present invention, the total functionality of FIG. 1 can be implemented in a hardware configuration using a 7-bit adder/subtractor, a 7 bit subtractor, and one 31 one-bit adders for a case where the sync pattern is 64 bits long, for example.

The general operation of the pattern match bit counter device 10 described in FIG. 1 includes first re-setting the input data frame window to an all-zeros condition, responsively to reset signal 100a for example. The adder/subtractor 110 can be initially loaded, via connection 110a, with the value of $Z_{pat}$ prior to providing the values of A and B thereto. The pattern match bit count device may then accept data into the data frame window until stopped or reset externally. The count of the number of bit matches (M) between the sync pattern 102 and the data frame window 100 is the value of the output of the subtractor 108. This value M may be checked after the data frame window bit content is changed or updated, as for example after each shift of a new bit into the input data frame window, so that the total number of bit matches between the pattern 102 and the data frame window 100 may be known.

Figure 2:
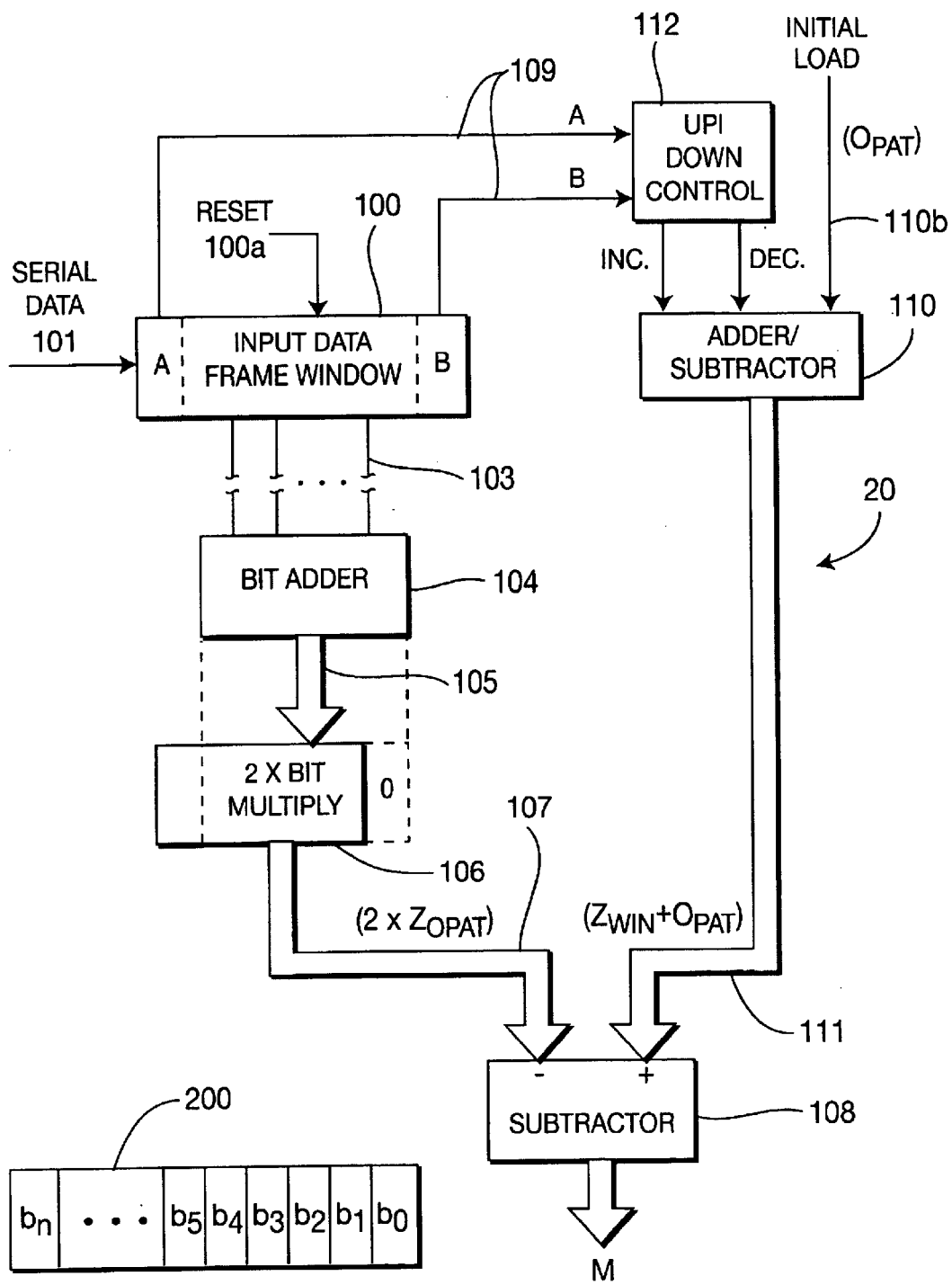
FIG. 2 illustrates a depiction of a bit pattern match device according to a second embodiment of the present invention.

FIG. 2 shows a block diagram of an embodiment of a pattern match bit count device 20 that is particularly useful when the number of zeros in the pattern 200 is greater than the number of ones in the pattern 200. A difference between the devices 10, 20 includes the connections 103 between bit adder 104 and frame window 100. In FIG. 2, the connections 103 facilitate the adding of the zeros in the window 100 corresponding to bit pattern locations which contain ones in the sync pattern 102. This represents the value $Z_{Opat}$. An additional difference is that the input data frame window 100 can be reset with an all-ones condition responsively to the signal 100a, for example, while the value of $O_{pat}$ 110b is initially loaded into the adder/subtractor 110, and finally, the up/down control 112 is used to count the number of zeros instead of the number of ones, so the state table shown herein in Table 1 is inverted with respect to the states of increment and decrement (i.e., the increments become decrements and the decrements become increments).

Figure 3:
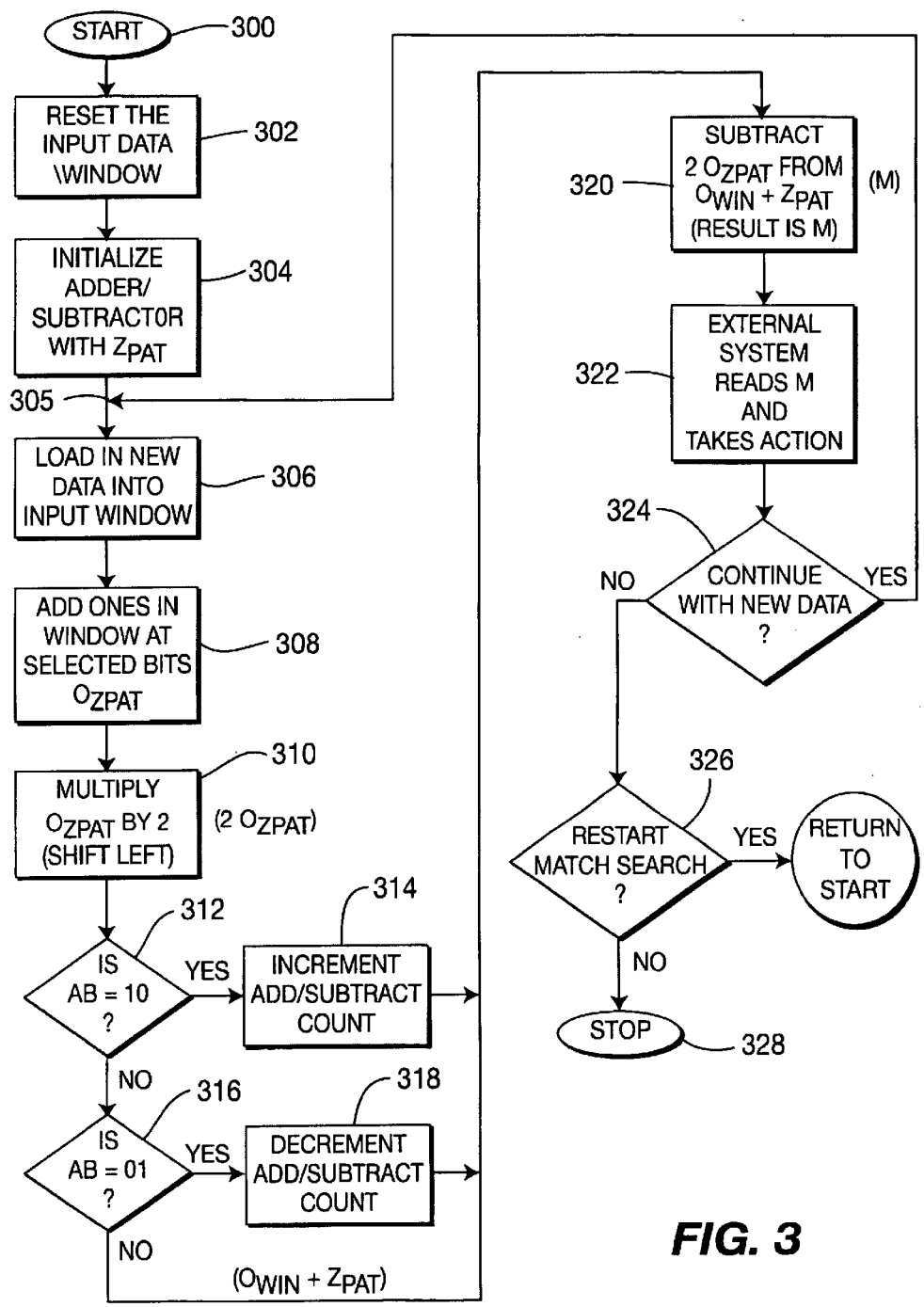
FIG. 3 illustrates a flow diagram for the method of generating a bit pattern match count according to a first embodiment of the present invention.

FIG. 3 illustrates a method of generating a count of the number of matches between a given pattern and the contents of an input data frame window according to an embodiment of the present invention. The embodiment of FIG. 3 is particularly useful where the number of ones in the given pattern is equal to or less than the number of zeros in the given pattern.

Upon start 300, the input data frame window is cleared 302. An adder/subtractor is initialized with a value of $Z_{pat}$ 304. Next, the data input frame window is loaded 306 with the data to be compared (e.g. first data bit is shifted into the data frame window). The next step 308 is to add the ones in the data frame window that correspond to the specific bit locations where there are zeros in the pattern. The sum of step 308 is then multiplied by 2 at step 310 to generate $2*O_{Zpat}$. The first (A) and last (B) bits of the input data frame window are checked for a 10 or a 01 pattern at steps 312 and 316, respectively, and the addition/subtraction count is incremented or decremented at steps 314 and 318, respectively. The value of the addition/subtraction count is $O_{win}+Z_{pat}$. If neither pattern exists, no change in the addition/subtraction count takes place. Next, step 320 is executed. Step 320 subtracts the quantity $2 \times O_{Zpat}$ from $O_{win}+Z_{pat}$. That result in step 320 is M, the number of bit matches between the given pattern and the input data frame window. This completes the task of generating the match count M.

If the device is to be used in a system, an optional step is to have an external system read the value of M at step 322 and take some action based on the value of M. That action could be a decision as in step 324 to continue looking for a pattern match in the data frame window or to restart the search for a pattern. If a pattern search is to continue, a return to point 305 can be performed. If a restart is desired 326, then a return to start 300 may be effected. Otherwise the system may halt at step 328.

Figure 4:
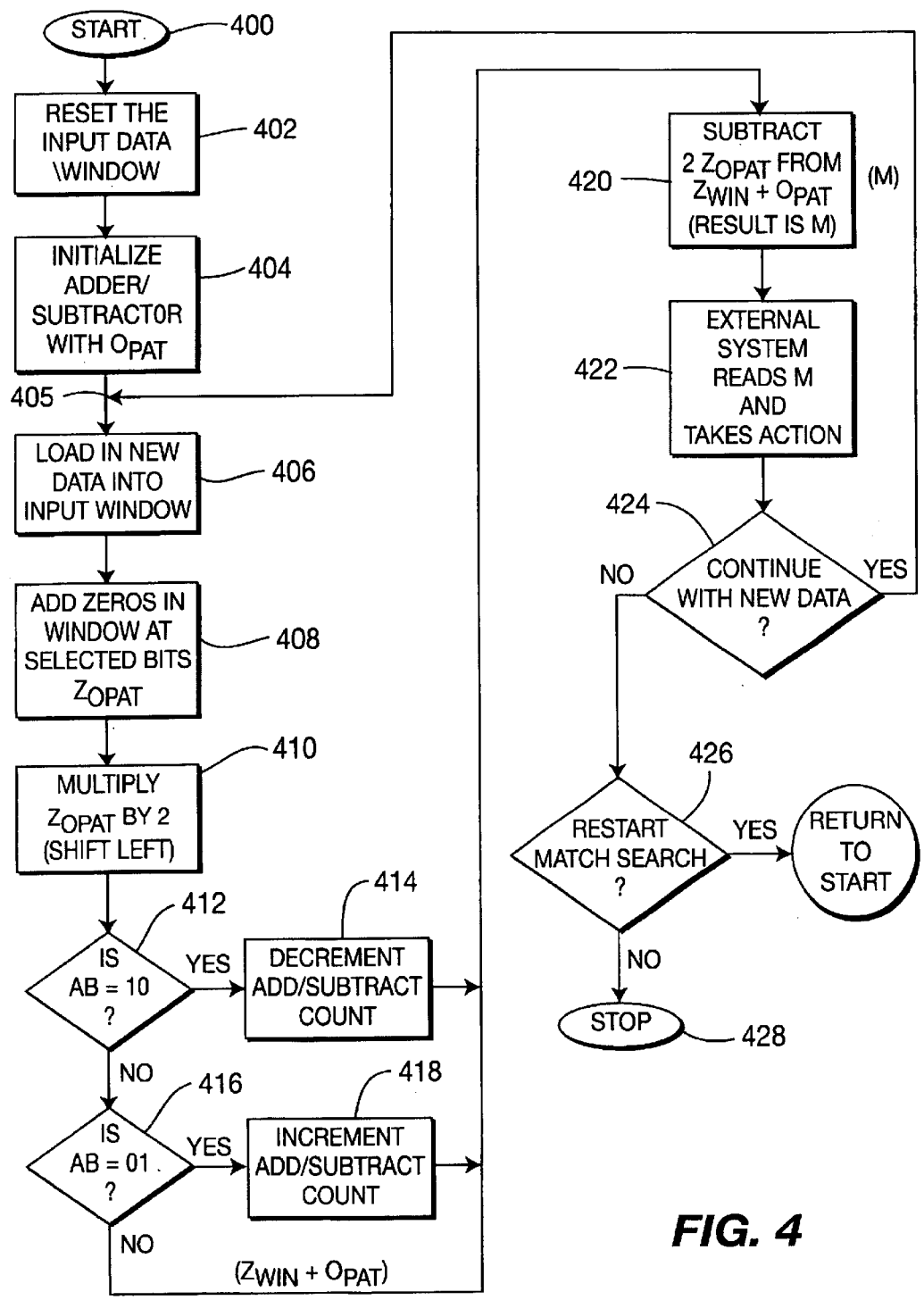
FIG. 4 illustrates a flow diagram for the method of generating a bit pattern match count according to a second embodiment of the present invention.

FIG. 4 illustrates a method of generating a count of the number of matches between a given pattern and the contents of an input data frame window according to an embodiment of the present invention. The embodiment of FIG. 4 is particularly useful where the number of zeros in the given pattern is equal to or less than the number of ones in the given pattern.

Upon start 400 of the process, the input data frame window is cleared 402. An adder/subtractor is initialized with the value of $O_{Zpat}$ 404. Next, the data input frame window is loaded 406 with the data to be compared (i.e. first data bit is shifted into the data frame window). The next step 408 is to add the zeros in the data frame window that correspond to the specific bit locations where there are ones in the given pattern. The sum of step 408 is then multiplied by 2 at step 410 to generate $2 \times Z_{Opat}$. The first (A) and last (B) bits of the input data frame window are checked for a 10 or a 01 pattern at steps 412 and 416, respectively and the addition/subtraction count is decremented or incremented at steps 414 and 418, respectively. The value of the addition/subtraction count is $Z_{win}+O_{pat}$. If neither pattern exists, no change in the addition/subtraction count takes place. Next, step 320 is executed. Step 320 subtracts the quantity $2 \times Z_{Opat}$ from $Z_{win}+O_{pat}$. That result in step 420 is M, the number of bit matches between the given pattern and the input data frame window. This completes the task of generating the match count M. If the device is to be used in a system, an optional step is to have an external system read the value of M at step 422 and take some action based on the value of M. That action can be a decision as in step 424 to continue looking for a pattern match in the data frame window or to restart the search for the given sync pattern. If a pattern search is to continue, a return to point 405 can be effectuated. If a restart is expected 426, then a return to step 400 can be made. Otherwise the system can halt at step 428.

Although the invention has been described and pictured in a preferred form with a certain degree of particularity, it is understood that the present disclosure of the preferred form has been made by way of example, and that numerous changes in the details of construction and combination and arrangement of parts and steps may be made without departing from the spirit and scope of the invention.

What is claimed is:

1. A machine implemented method for identifying a bit pattern in a data stream comprising a plurality of bits each having a first or second state, said method comprising:
   identifying a number of mismatching bits, within a subset of said plurality of bits, having said first state and a bit correspondence with said second state within said pattern;
   identifying a number of bits in said subset having said first state; and,
   identifying a number of bits in said pattern having said second state;
   wherein, a number of matches of between said subset and said pattern is dependent on said identified number of mismatching bits, said identified number of bits in said subset having said first state and said identified number of bits in said pattern having said second state.

2. The method of claim 1, further comprising increasing the number of mismatching bits by a given factor.

3. The method of claim 2, wherein said given factor is two.

4. The method of claim 2, further comprising summing said identified number of bits in said subset having said first state and said identified number of bits in said pattern having said second state to generate a sum.

5. The method of claim 4, wherein said summing comprises initializing a count with the number of bits in said pattern having said second state.

6. The method of claim 5, wherein said summing further comprises comparing a first bit of said subset to a second bit of said subset.

7. The method of claim 6, wherein said summing further comprises incrementing said count if said first bit is greater than said second bit.

8. The method of claim 7, wherein said summing further comprises decrementing said count if said second bit is greater than said first bit.

9. The method of claim 8, wherein said first and second bits are temporally related in said data stream.

10. The method of claim 8, wherein said count equals said generated sum of said identified number of bits in said subset having said first state and said identified number of bits in said pattern having said second state.

11. The method of claim 4, further comprising subtracting said increased number of mismatching bits from said sum to generate a difference, wherein said difference corresponds to a number of matches between said bits in said subset and said bits in said pattern.

12. The method of claim 1, wherein said bit pattern is a sync word.

13. The method of claim 1, further comprising identifying said subset, wherein said identifying said subset comprises detecting incoming ones of said bits of said data stream.

14. The method of claim 13, wherein said identifying said subset further comprises forming data words corresponding to said subset from said detected incoming bits of said data stream.

15. The method of claim 14, wherein said forming data words comprises forming a data word from said incoming bits each time a select number of bits are detected.

16. The method of claim 15, wherein said select number is 1.

17. The method of claim 15, wherein said select number is greater than 1.

18. The method of claim 13, wherein said identifying said subset further comprises loading a register with said incoming bits of said data stream.

19. The method of claim 18, further comprising clearing said register prior to said detecting.

20. The method of claim 1, wherein said identifying a number of mismatching bits comprises providing connections for select ones of said subset of said plurality of bits.

21. The method of claim 1, further comprising storing at least a portion of said data stream in at least one memory.

22. The method of claim 1, further comprising storing data in at least one memory device being indicative of said number of matches.

23. The method of claim 1, further comprising receiving a signal indicative of said data stream.

24. A computer program product embodied on a computer-readable storage medium and for identifying a bit pattern in a data stream comprising a plurality of bits each having a first or second state, said computer program product comprising:
   code for identifying a number of mismatching bits, within a subset of said plurality of bits, having said first state and a bit correspondence with said second state within said pattern;
   code for identifying a number of bits in said subset having said first state; and,
   code for identifying a number of bits in said pattern having said second state;
   wherein, a number of matches of between said subset and said pattern is dependent on said identified number of mismatching bits, said identified number of bits in said subset having said first state and said identified number of bits in said pattern having said second state.

25. The product of claim 24, further comprising code for increasing the number of mismatching bits by a given factor.

26. The product of claim 25, wherein said given factor is two.

27. The product of claim 25, further comprising code for summing said identified number of bits in said subset having said first state and said identified number of bits in said pattern having said second state.

28. The product of claim 27, wherein said code for summing comprises code for initializing a count with the number of bits in said pattern having said second state.

29. The product of claim 28, wherein said code for summing further comprises code for comparing a first bit of said subset to a second bit of said subset.

30. The product of claim 29, wherein said code for summing further comprises code for incrementing said count if said first bit is greater than said second bit.

31. The product of claim 30, wherein said code for summing further comprises code for decrementing said count if said second bit is greater than said first bit.

32. The product of claim 31, wherein said first and second bits are temporally related in said data stream.

33. The product of claim 31, wherein said count equals the sum of said identified number of bits in said subset having said first state and said identified number of bits in said pattern having said second state.

34. The product of claim 27, further comprising code for subtracting said increased number of mismatching bits from the sum of said identified number of bits in said subset having said first state and said identified number of bits in said pattern having said second state to generate a difference, wherein said difference corresponds to a number of matches between said bits in said subset and said bits in said pattern.

35. The product of claim 24, wherein said bit pattern is a synchronization word.

36. The product of claim 24, further comprising code for detecting incoming ones of said bits of said data stream.

37. The product of claim 36, further comprising code for forming data words corresponding to said subset from said detected incoming bits of said data stream.

38. The product of claim 37, wherein said code for forming data words comprises code for forming a data word from said incoming bits each time a select number of bits are detected.

39. The product of claim 38, wherein said select number is 1.

40. The product of claim 36, wherein said code for identifying said code for subset further comprises code for loading a register with said incoming bits of said data stream.

41. The product of claim 40, further comprising code for clearing said register prior to said detecting.

42. The product of claim 24, wherein said code for identifying a number of mismatching bits comprises code for providing select ones of said subset of said plurality of bits.

43. A device for identifying a bit pattern in a data stream, said device comprising:
    a memory for storing a plurality of bits indicative of at least a portion of said data stream, each of said bits having a first state or a second state;
    an adder communicatively coupled to said memory so as to sum select ones of said bits corresponding to select bit locations in said bit pattern;
    a controller communicatively coupled to said memory device so as to receive at least a portion of said bits and for determining which of a plurality of predetermined conditions is present based upon said received portion of said bits;
    an adder/subtractor communicatively coupled and responsive to said controller to selectively increment and decrement a given value if a select one of said bits corresponds to a mismatching condition with said bit pattern; and,
    a subtractor coupled to said adder and adder/subtractor.

44. The device of claim 43, wherein said memory is suitable for storing at least as many bits as the bit pattern.

45. The device of claim 43, wherein said memory comprises a register.

46. The device of claim 43, wherein said memory comprises a plurality of flip-flops.

47. The device of claim 43, wherein said select bit locations correspond to bits in said bit pattern having said first state.

48. The device of claim 43, further comprising a multiplier coupled to said adder.

49. The device of claim 48, wherein said multiplier comprises a doubler.

50. The device of claim 48, wherein said multiplier comprises means for left shifting bits of said adder.

51. The device of claim 43, wherein said controller and adder/subtractor cooperate to increment said given value in a first mismatching condition and decrement said given value in a second mismatching condition distinct from said first mismatching condition.

52. The device of claim 51, wherein a first select one of said bits is less than a second select one of said bits in said first mismatching condition and greater than said second select one of said bits in said second mismatching condition.

53. The device of claim 51, wherein said first select one of said bits is an incoming bit and said second select one of said bits is an exiting bit.

54. The device of claim 43, wherein said adder/subtractor is coupled to a minuend input of said subtractor.

* * * * *